United States Patent
Mayer et al.

(10) Patent No.: US 6,351,823 B1
(45) Date of Patent: Feb. 26, 2002

(54) METHOD AND DEVICE FOR MONITORING A COMPUTER SYSTEM HAVING AT LEAST TWO PROCESSORS

(75) Inventors: Hermann Mayer, Vaihingen; Manfred Hellmann, Hardthof; Hermann Winner, Karlsruhe; Ralph Lauxmann, Korntal-Muenchingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/187,101

(22) Filed: Nov. 5, 1998

(30) Foreign Application Priority Data

Nov. 6, 1997 (DE) .......................................... 197 49 068

(51) Int. Cl.⁷ ................................................ G06F 11/30
(52) U.S. Cl. ....................................... 714/10; 709/208
(58) Field of Search .............................. 714/10, 2, 3, 8, 714/11, 12, 18, 25, 30, 32, 37, 39, 48; 712/9, 10; 709/208, 209; 710/20, 21

(56) References Cited

U.S. PATENT DOCUMENTS

| | | | | |
|---|---|---|---|---|
| 4,598,356 A | * | 7/1986 | Dean et al. ................. | 364/200 |
| 5,016,249 A | * | 5/1991 | Hurst et al. ................. | 371/16.1 |
| 5,367,665 A | * | 11/1994 | Koch et al. .................. | 395/575 |
| 5,367,697 A | * | 11/1994 | Barlow et al. ............... | 395/800 |
| 5,436,837 A | * | 7/1995 | Gerstung et al. ...... | 364/424.03 |
| 5,526,267 A | * | 6/1996 | Sogawa .................. | 364/431.11 |
| 5,987,365 A | * | 11/1999 | Okamoto ..................... | 701/29 |
| 6,067,586 A | * | 5/2000 | Ziegler et al. ................. | 710/18 |

* cited by examiner

Primary Examiner—Nadeem Iqbal
(74) Attorney, Agent, or Firm—Kenyon & Kenyon

(57) ABSTRACT

A method and a device for monitoring a computer system which includes at least two processors. A first processor of the at least two processors monitors at least a second processor for correct functioning, by monitoring output signals of the second processor or the variables derived from it, at least with regard to their temporal sequence, their content, or their signal (wave) form. A relay of the output signals of the second processor to further units is blocked when the first processor, separately from the second processor, is placed in an energy-conserving operating mode.

10 Claims, 3 Drawing Sheets

“METHOD AND DEVICE FOR MONITORING A COMPUTER SYSTEM HAVING AT LEAST TWO PROCESSORS”

FIELD OF THE INVENTION

The present invention relates to a method and a device for monitoring an operation of a computer system that has at least two processors.

BACKGROUND INFORMATION

A conventional device is described in German Patent No. 37 00 986. In particular, this German Patent describes a computer system having two processors, which contribute equally to the processing work of the entire system. To be able to recognize in a timely manner the errors that arise, the two processors reciprocally monitor each other. This monitoring proceeds in the course of a cyclical data exchange between the two processors in the form of a handshake operation. In this context, it is possible that each processor may restart the other, e.g., after the cessation of an interference effect regarding the I/O bus of one of the two processors or in response to a long-lasting total failure of one of the two processors. In addition to the monitoring by means of a cyclical data exchange, provision is made for a first and a second pump circuit, each of which is assigned to a processor. With a positive logic as the basis, the two pump circuits each supply a logic 1, as long as they are controlled by a timing signal of the respective assigned processor. The monitoring of the output signals from each pump circuit by the other respective processor offers a second possibility for reciprocal monitoring, in the form of a watchdog circuit.

The conventional device described above makes it possible to reciprocally (and reliably) monitor two processors, which can execute tasks that either are of equal status or are subordinated, one to the other. However, if one of the two processors is not needed during a time period either known in advance or expectable, in order to reduce the power loss, it would be useful during this time period to switch from this operating mode to one which uses less energy, such so-called power-save modes in processors are already known and can, in many cases, be activated and deactivated via an external control input. During such a power-save mode, a processor generally does not carry out any operations, which results in substantially reducing the use of current and thus also of power compared to a normal operating mode. However, this means that during a power-save mode of this type no operations for monitoring another processor are possible. In the case of the arrangement described in German Patent No. 37 00 986, it is therefore not possible to shift one of the processors into a power-save mode, without giving up the continuous monitoring function of the other processor.

SUMMARY OF THE INVENTION

It is an object of the present invention to provide a device and a method in which an error-free functioning of the computer system is assured even when one processor participating in the reciprocal monitoring is put into a power-save mode.

The idea underlying the present invention is that monitoring an operation of a processor can be dispensed with for as long as no external effects proceed from it. In technical terms, this means that the monitoring can be dispensed with for as long as the monitored processor does not transmit any output signals to other units. Such other units can be, for example, other computers in a network or final control elements in a closed-loop control system. A device and a method are indicated in which the output signal of the monitored processor is blocked for as long as the monitoring processor is in a power-save mode.

One of the advantages of the present invention is that monitoring of the operation of a processor is dependably provided by a further processor even when the monitoring processor is shifted into a power-save mode. A device according to the present invention thus makes it possible to reduce power loss while maintaining undiminished monitoring of the operation. This is particularly necessary in the use of a multi-processor system in a motor vehicle. At the same time, the method and device according to the present invention can be realized cost-effectively, in a very simple manner, and with minimal outlays.

DETAILED DESCRIPTION

Figure 1:
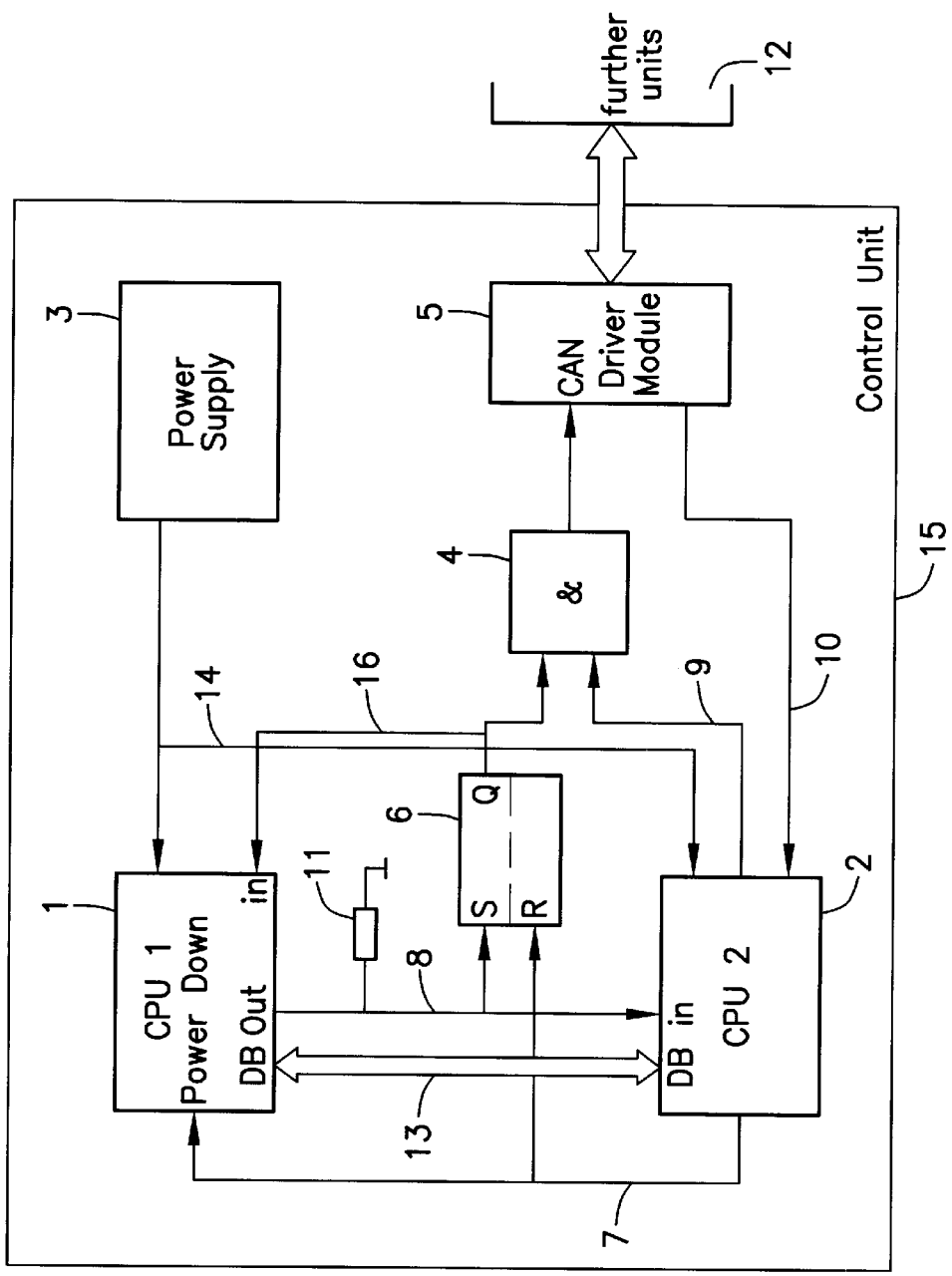
FIG. 1 shows a block diagram of an exemplary embodiment of a device according to the present invention.

FIG. 1 shows a block diagram of an exemplary embodiment of a device according to the present invention. Reference number 1 designates a first processor, reference number 2 designates a second processor, and reference number 3 designates a power or voltage supply, all of which belong to a control unit 15. Voltage supply 3, via connector leads 14, supplies at least processors 1 and 2 with the power they require. Two processors 1 and 2 are connected to each other via an interface having corresponding connector leads 13, which permit them to exchange data and/or control commands. Processor 2 is connected via a transmitter cable 9 to an AND-gate 4, forming a gate circuit. A second input of AND-gate 4 is connected to the output of a flip-flop 6. Flip-flop 6 is controlled at its set input by a control signal 8 of processor 1. At its reset input, flip-flop 6 is controlled by a control signal 7 of processor 2. The output of AND-gate 4 is connected to a block 5, which represents an interface with an external network. For example, block 5 contains a driver module for controlling an external network bus. Connected to this network are further units 12. For the preferred application of the present invention in the case of a motor vehicle, the external network bus is preferably a CAN-bus, which is well known in the field (Controller Area Network). The further units are then, for example, other control units.

Reference numeral 10 designates a receiving lead, via which receiving signals are fed to processor 2 from the further units. Of course, transmitter cable 9 and receiving lead 10 can also contain a plurality of parallel leads. Control lead 7 from processor 2 also runs to a power-down input of processor 1. Reference numeral 11 designates a pull-down resistor, which functions to assure a stable signal level in control lead 8. In addition, a connection 16 leads from the output of flip-flop 6 to an input of processor 1. In this way, processor 1 receives information about the output condition of flip-flop 6.

In the exemplary embodiment shown in FIG. 1, processor 1 is a signal processor of a distance sensor, in particular a radar system, which is installed in a motor vehicle for detecting motor vehicles traveling ahead. Processor 2 is a control signal evaluating processor for evaluating control signals on the basis of the data of signal processor 1 supplied to it. In concrete terms, processor 2 is a control processor for evaluating the setpoint values of an adaptive driving speed control. However, the present invention is by no means limited to these applications of the processors and in principle can be applied to any computer system having at least two processors.

In the normal operating mode of the device shown in FIG. 1, both processors 1 and 2 function in accordance with their respective main functions. At the same time, at least one monitoring operation of processor 2 by processor 1 takes place. Preferably, both processors monitor each other, even reciprocally, as described in German Patent No. 37 00 986. According to the present invention, the reciprocal monitoring takes place, for example, by means of an alternating exchange of test data via interface 13. In this context, it can be established that each of the two processors receives a test inquiry from the respective other processor in a preselected time pattern. If the test inquiry fails to materialize within the preselected time pattern, it is an indication of a malfunction. If a test inquiry is received at one of the processors, it responds to the inquiry, within a likewise preselected time pattern, with a data value determined by itself. If the data value determined by it differs from an expected data value, it is also an indication of a malfunction. The test inquiries and responses thus contain test tasks, which each of the processors poses to the respective other one within the preselected time pattern. The test tasks are preferably constructed such that they address as many areas of the hardware and the software of the monitored processor as possible. This assures that the test results are very representative. It is advantageous if an erroneous test response also makes possible a conclusion as to the respective malfunction or the respective source of the error. By means of the preselected time pattern, a watchdog function is realized. Of course, the reciprocal monitoring of the two processors can occur by means of other procedures, either as a supplement or as an alternative.

If the computational or signal processing output of processor 1, based on its main function, is not needed for a known or expected time period, it is useful to shift the processor into an energy-conserving mode, a so-called power-save mode. For this purpose, various possibilities are known. As shown in FIG. 1, such a switchover of processor 1 by means of processor 2 takes place via control lead 7. However, since processor 1 does not carry out any computational operations during this power-save mode, it is also not in a position to respond to test inquiries of processor 2 or pose them to processor 2. In this context, the first case is not critical, since processor 1 itself is not carrying out any computational operations and thus a malfunction would have no consequences. However, the reliable functioning of processor 2 is no longer assured. For example, a situation of this sort is conceivable in the above-described application if processor 1 is located in a distance sensor and processor 2 in a control unit for adaptively controlling the driving speed. For example, a distance measurement using processor 1 would not be necessary for a specific time period if, after a braking action of the driver, the function of the adaptive driving speed control was deactivated, without, however, shutting it down altogether. In this case, it can be advantageous (in order to save energy) for processor 2 to shift processor 1 into the power-save mode. According to the present invention, in this context, gate circuit 4 is blocked by flip-flop 6. Alternatively, gate circuit 4 could be controlled directly, for example, by processor 1, also via control signal 8. For this purpose, processor 1 must set control signal 8 at a low voltage level while it is in the power-save mode. In addition, there are numerous other possibilities for controlling gate circuit 4, which, however, should be considered as being within the normal range of actions.

The blocking of gate circuit 4 results in the output signals of processor 2 no longer being able to arrive at block 5 and thus no longer at the further units 12. In this way, the external effects of processor 2 are ended. However, this does not necessarily mean that processor 2 is likewise switched off. It can receive data or control commands over receiving lead 10, and it can process them. Via a branch of control lead 8, processor 2 advantageously receives the signal that its external effects have been ended by processor 1.

Figure 2:
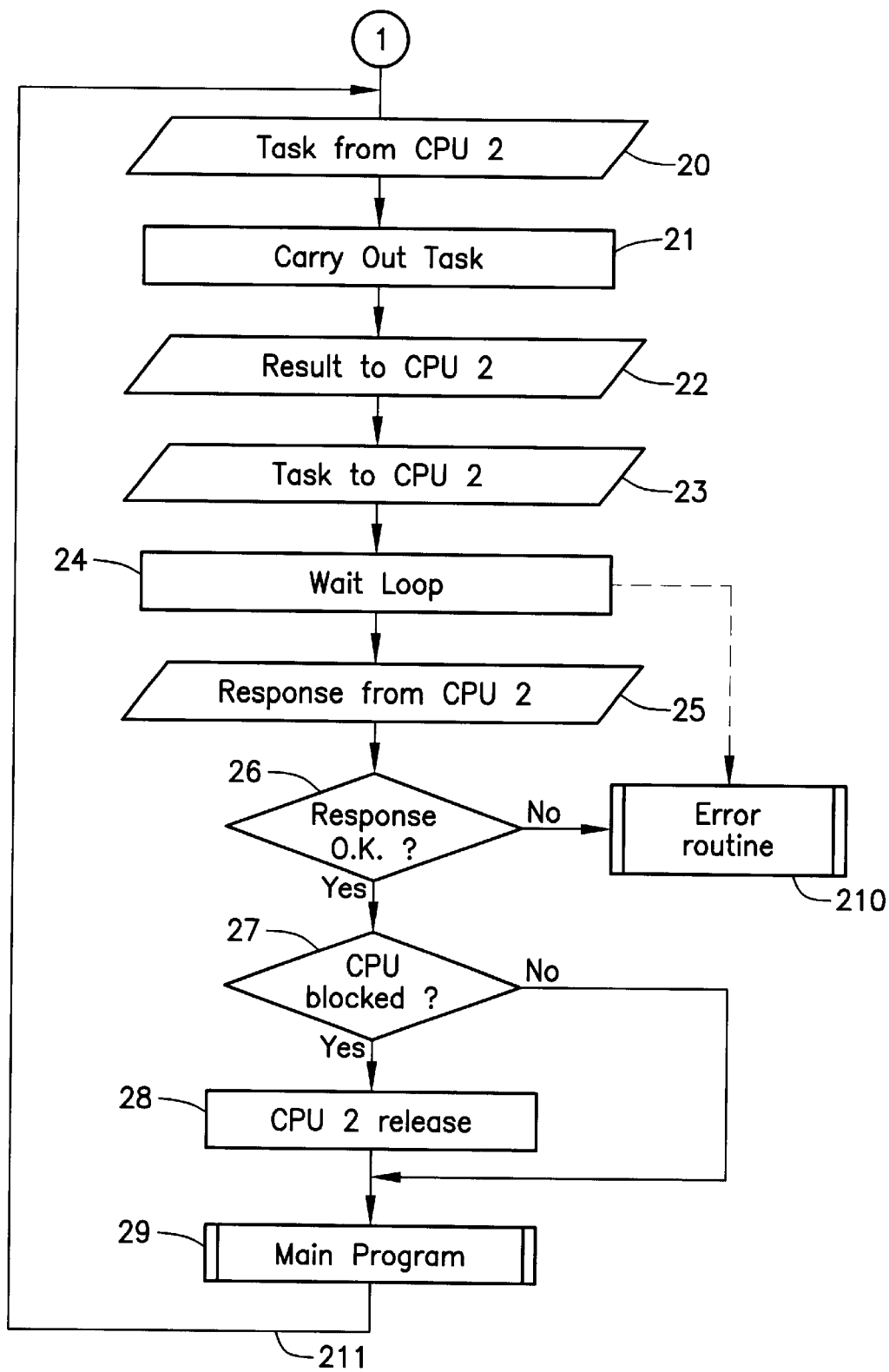
FIG. 2 shows a flow chart of a first method executed by a first processor.

FIG. 2 shows a flow chart of an exemplary embodiment of a method according to the present invention executed in first processor 1. After every start and thus also after every termination of a power-save mode, processor 1, in step 20, first expects a test task from processor 2. According to step 21, it carries out the task as posed and in step 22 transmits its result to processor 2. Then, in step 23, processor 1 for its part poses a test task to processor 2. Step 24 designates a wait loop in which processor 1 waits for the result from processor 2. If the result fails to appear after a predetermined wait time has elapsed or if the answer according to step 26 does not agree with the expected answer, then it is an indication of an error condition in processor 2. In both cases, the process branches off to an error routine 210. Otherwise, according to step 27, the question is posed as to whether gate circuit 4 is blocked. This can preferably occur on the basis of the signal level of lead 16. If the gate circuit is blocked, according to step 28, gate circuit 4 is released. Otherwise, the process branches off directly to main program 29 of processor 1. Normally, steps 20 through 26, which represent the reciprocal testing of the two processors, are repeated in cycles. In FIG. 1, this is indicated by branch 211.

Figure 3:
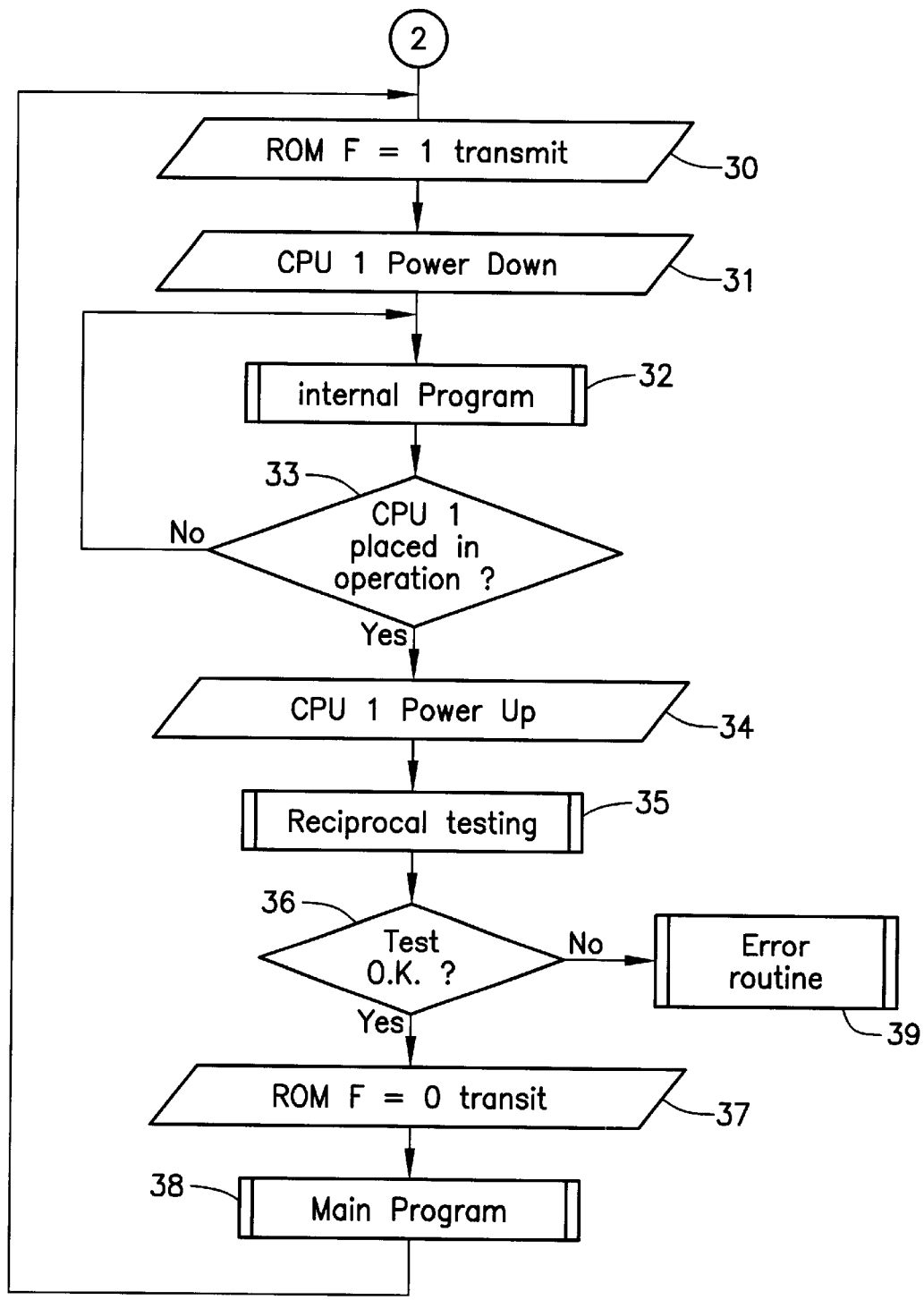
FIG. 3 shows a flow chart of a second method executed by a second processor.

FIG. 3 shows a flow chart of an exemplary embodiment of a method according to the present invention executed in second processor 2. In the normal case, processor 2 executes its main program 38. If processor 1 is to be switched over to its more energy-conserving power-save mode, the process branches over to step 30. In step 30, information is first transmitted to further units 12 that the output signals of processor 2 are then blocked. It is advantageous for further units 12 to have such information so that, in the absence of the requested output signals, they do not conclude that a malfunction has occurred in the processor or in control unit 15 containing it. This information can be generated either in terms of hardware or software. FIG. 3 shows a software solution, in which a ROMF=1 (Read-Only Mode Flag) is transmitted to further units 12. Then in step 31, the power-save mode of processor 1 is activated via control lead 7. Simultaneously, flip-flop 6 in the circuit shown in FIG. 1 is reset so that AND-gate 4 then blocks the output signals of processor 2. In step 32, processor 2 can now execute an internal program which does not produce any output signals for other units 12. Step 33 contains an inquiry as to whether processor 1 should be placed back into normal operation. This is necessary, on the one hand, if processor 2 wants to transmit output signals to further unit 12 or, on the other hand, if processor 1 is needed, in the context of its normal main function. If processor 1 is to be placed back into normal operation, processor 2, in step 34, takes back the power-down signal on control lead 7.

According to step 35, as the next operation, a reciprocal testing of the two processors then follows, as is shown (for steps 20 through 26) in FIG. 2. If the test gives indication of an error, the process branches off, in step 36, to a particular error handling (routine) 39. If there is no indication of an error, then, in step 37, information is transmitted to other units 12 that the output signals of processor 2 or of control unit 15 are now no longer blocked. In step 30, in this case, a ROMF=0 is transmitted to other units 12. Then processor 2 in turn processes its designated main program 38. As a result of the reciprocal testing in steps 20 through 26 or 35, the error-free operation of processor 2 is at all times assured if it is transmitting output signals to other units 12. Nevertheless, as shown, processor 1 can be temporarily placed in a power-save mode.

It is also advantageous for gate circuit 4 to be blocked by processor 1 when processor 1, on the basis of the function test, detects an error condition in processor 2. Conversely, in such a case, processor 2 can shift processor 1 into the power-save mode, or, alternatively, such as is described, for example, in German Patent No. 37 00 986, return it to that mode.

The exemplary embodiment described above represents a preferred application of the present invention. However, the present invention is not limited to this. For example, within the above-described device, there can also be more than the two cited processors 1 and 2. A reciprocal testing, as well as a switchover to a power-save mode, is then conceivable in various combinations. Similarly, the basic principle of the present invention of a reciprocal monitoring of two processors can be applied to a reciprocal monitoring of two or more complete control units. Furthermore, in this case, using the basic idea of the present invention, a switchover of individual control units participating in reciprocal monitoring can be realized in a power-save mode.

What is claimed is:

1. A method for monitoring a computer system, the computer system including at least two processors, the at least two processors including a first processor and a second processor, the method comprising the steps of:

generating output signals from the second processor;

monitoring particular characteristics of the output signals with the first processor to determine whether the second processor is operating correctly, the particular characteristics including one of a temporal sequence, a content and a signal form of the output signals; and blocking a relay of the output signals to at least one further unit when the first processor is placed in an energy-conserving operating mode independently from the second processor.

2. The method according to claim 1, further comprising the steps of:

reciprocally testing the first and second processors to determine whether an error occurred in at least one of the first processor and the second processor; and with the first processor, unblocking the relay of the output signals when the first processor is placed in a normal operating mode and if the error did not occur during the testing step.

3. The method according to claim 1, further comprising the step of:

transmitting particular information to the at least one further unit to determine whether the output signals from the second processor are suppressed.

4. The method according to claim 1, wherein the computer system includes a control unit for a motor vehicle.

5. A device for monitoring a computer system, the computer system including at least two processors, the at least two processors including a first processor and a second processor, the device comprising:

a first arrangement utilized by the first processor to monitor an operation of the second processor;

a second arrangement placing the first processor in an energy-conserving operating mode independently from the second processor; and a third arrangement driven by the first processor and suppressing output signals generated by the second processor.

6. The device according to claim 5, wherein the second processor is coupled to at least one further unit, and further comprising:

a fourth arrangement providing a signal to the at least one further unit indicating whether the output signals generated by the second processor are suppressed.

7. The device according to claim 5, wherein the second arrangement is activated by the second processor.

8. The device according to claim 5, wherein the first processor includes a signal processor which prepares received test signals, and wherein the second processor includes a control-signal evaluating processor which evaluates control signals as a function of the received test signals prepared by the first processor.

9. The device according to claim 8, wherein the signal processor is contained in a distance sensor, and wherein the control-signal evaluating processor includes a driving speed control processor.

10. The device according to claim 5, wherein the computer system includes a control unit for a motor vehicle.

* * * * *